March 11, 1958  C. M. DE WOODY  2,826,265
FILTER ELEMENT
Filed April 4, 1955

INVENTOR
CHARLES M. DeWOODY
BY
ATTORNEY

18# United States Patent Office 2,826,265
Patented Mar. 11, 1958

2,826,265

FILTER ELEMENT

Charles M. De Woody, Vineland, N. J., assignor to Ace Glass Incorporated, Vineland, N. J., a corporation of New Jersey Application April 4, 1955, Serial No. 498,849

9 Claims. (Cl. 183—69)

This invention relates to filters for scientific and chemical laboratories and consists more particularly in new and useful improvements in a bacterial filter in the form of a compressed disc including one or more layers of a glass fiber mat commonly known as "glass paper," molded and fused to form a unified porous mass of predetermined density.

Heretofore, various sintered glass filters have been made by fusing sized or classified particles or fibers together to form a porous mass. The sized glass particles or fibers are placed in a mold and treated at a controlled temperature for a given time, after which the mold is cooled and the molded glass shape removed. In these filters the pore diameters obtained are a function of the particle size, the heating cycle, and the pressure applied while the glass is in a softened state. The applied pressure may be simply the weight of a mold lid or the result of a directly applied force of considerable magnitude i. e. 150 pounds per square inch.

Because of the costly procedure in the manufacture of smaller particles of glass, particularly those in the sub-sieve range, it has been customary in the manufacture of bacterial filters to make thin plates of the finest sizes and to place these over coarser plates, or to use the thin plates only, in small diameters so that the filtering pressure would not cause breakage. Where two plates or discs have been employed, it has not been customary to seal them together, except in some instances at the peripheral edges where the seal was made with the containing body.

In normal use the pores of a filter tend to clog and the general method of clearing such clogged pores, is back-washing or reversing the flow of fluid through the filter. Thus, even with two or more plates together in unsealed engagement, each thin plate must be strong enough to withstand the back-washing pressure.

Aside from the cost of manufacture, sintered glass filters formed of small particles have certain definite disadvantages. For example, there are dust problems in the handling of this very fine material; there is no assurance of uniformity in the porous structure of the finished product, as thin layers of small particles tend to shift in sintering, and there has been a limitation to the width of such filters because of inadequate strength.

It is therefore the object of the present invention to overcome the disadvantages inherent in known glass filters and to provide a filter formed essentially of thin layers of thermoplastic material consisting of non-woven fiber mats capable of being sintered under controlled conditions of heat and pressure to provide a unified porous mass.

It is another object of the invention to provide a glass filter having more uniform filtering characteristics throughout the entire mass, by virtue of the greater uniformity of the thin layers of fine thermoplastic fiber mats.

Still another object of the present invention is to provide a glass filter and method of forming the same, whereby large size bacterial filters are economically feasible for the first time, without sacrificing the strength of the filter and ability to withstand back-washing pressures.

A still further object of the invention is to provide a relatively inexpensive glass filter, wherein large area filtration of a maximum practical thickness can be obtained.

Another object of the invention is to provide a filter disc which due to the particular characteristics of the thermoplastic material used, and the conditions of fabrication, possesses greater uniformity and control of pore sizes, and permeability, greater ease in handling and economy of manufacture, due to the ability to fabricate the disc in substantially one operation and as an integral unit without the necessity of separately fusing two or more sintered laminations or discs.

A further object is to provide a laminated filter disc, the outer laminations of which may be fused under conditions which will increase their effective filtering surface.

With the above and other objects in view which will appear as the description proceeds, the invention consists in the novel features herein set forth, illustrated in the accompanying drawings and more particularly pointed out in the appended claims.

Referring to the drawing in which numerals of like character designate similar parts throughout the several views, Figure 1 is a top plan view of a filter disc made in accordance with the invention.

Figure 7:
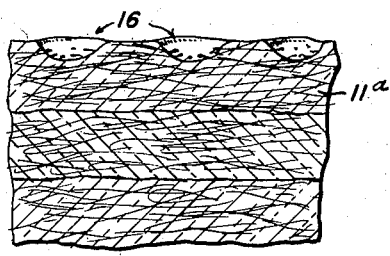
Figure 8:
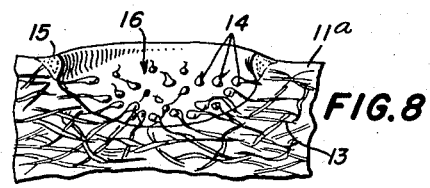

Figure 7 is an enlarged fragmentary sectional view, comprising an exaggerated showing of the physical structure of the outer and intermediate laminations of a filter disc made in accordance with the invention, and Figure 8 is a similar view greatly enlarged, to illustrate one of the crater formations which under certain conditions may be developed in the outer lamination or laminations of the filter disc.

In the embodiment of the invention shown in the drawings, my inproved filter is in the form of a circular disc, generally indicated at 10, compressed under controlled heat and pressure conditions to provide the desired density and porosity. As before indicated, the filter disc may embrace any of several forms although one essential feature prevails in all forms, namely, the use of one or more thin layers of a non-woven mat of fine fibers having thermoplastic properties and capable of being sintered or fused with similar layers or with an intervening body of coarser material, to form a unified porous mass.

Figure 1:
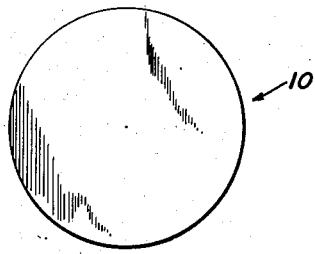
Figure 2:
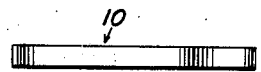
Figure 2 is a view in side elevation.
Figure 3:
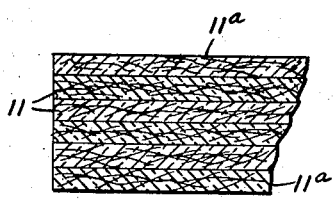
Figure 3 is an enlarged fragmentary vertical section, diagrammatically illustrating one form of the invention, consisting of laminations of fine matted glass fiber.

In the form shown in Figure 3, the filter disc is fabricated by placing a series of thin layers 11—11ª of nonwoven matted staple glass fibers, commonly known as "glass paper," in a mold and fusing the layers together by means of heat and pressure to form a unified porous mass. Temperature and pressure are related functions and normally the temperatures are confined to within the range of 1300° to 1600° F., with pressures ranging from the mere weight of a mould lid, to 150 pounds per square inch.

It is important that the nature of the material of which the mat is formed and the temperature and pressure conditions maintained, be such that the result of the mold treatment is a contact fusion from fiber to fiber as distinguished from a continuous or overall fusion, where the fibers in the mat would lose their individual identity. In other words, it is important to maintain the required uniform porosity and pore size throughout the entire filter which is one of the distinct advantages available by the use of thin layers of glass fiber mat when treated under properly controlled temperature and pressure conditions.

By thus fusing the laminations of glass fiber mat as distinguished from the use of several layers of sized or classified particles or a mass of compressed fibers, a far greater uniformity of structure and porosity is obtainable. Furthermore, because of the fact that "glass paper" is available in long rolls and in widths up to at least 24 inches, large area filters of almost any practical thickness can be made at relatively small cost, by simply laminating the sheets and sintering between two plates which serve as an inexpensive mold.

Figure 4:
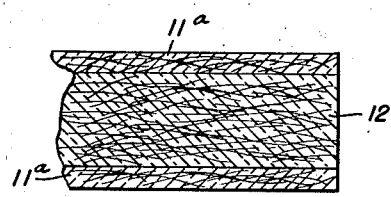
Figure 4 is a similar diagrammatic view showing a modified form of the invention, wherein the intermediate portion of the filter comprises a body of coarse glass fiber.

In the embodiment of the invention illustrated in Figure 4, the filter disc is formed by placing in a mold a mass 12 of fine drawn glass fibers of predetermined size and crushing them under an initial weighted pressure, after which, sheets or laminations 11a of "glass paper" are placed on the smooth external surfaces of the mass. The mold and its contents are placed in an oven and are sintered at a temperature within the range of 1300° to 1600° F. after which the mold is removed from the oven and a ram pressure applied to compress the material to the desired density. The disc is then put in an annealing oven to slowly cool through a critical range so that objectionable strains will not be introduced into the glass structure. The final product is a disc of one or more laminations 11—11a of "glass paper," with a coarser porous body 12 interposed therebetween and fused to form a unified porous mass of uniform density and porosity.

If desired, the intervening porous mass 12 may be originally particulate, or a rigid preformed porous body subsequently fused to the adjacent surfaces of the containing layers 11a of "glass paper," forming after fusion, a continuous structure.

One of the important features of this invention resides in the discovery that "glass paper," a known product, when arranged in laminated form in a mold and subjected to a basically old set of pressure and temperature conditions, results in a greatly improved filter of more uniform porosity and permeability. The particular characteristic of "glass paper" which makes this result possible, is the ability of the fibers of any one sheet or lamination to be subjected to contact fusion as before indicated, and the contacting fibers of adjacent laminations to likewise become fused when subjected to the required heat and pressure conditions.

The thickness of the "glass paper" sheets normally used, is from 0.01 inch to 0.05 inch, per layer and the fiber diameter in the paper is 10 microns or less. Coarser material in intermediate layers may be up to the order of 120 microns, but preferably not over 30 microns for economic use of the "paper." With the coarser intermediate layers the "paper" must be thicker to avoid puncture or breaks through. The former occurs in manufacture where individual fibers pierce the "paper" while the latter occurs in service due to too large a hole under the thin fused "paper" layer.

Starting with a given fiber diameter and a constant pressure, the lowest fusion temperature will result in the largest possible pore diameter throughout the mass. An increase in the temperature decreases the pore diameter and the effect of pressure is also to reduce the pore diameter and volume. In other words, the pore size may be regulated by temperature control and permeability by pressure control. An increase in pressure reduces the permeability.

In the fabrication of certain types of filters under the present invention, where temperatures not exceeding 1410° F. are used in the furnace, the contact fusion above referred to is more or less uniform throughout all of the laminations. However, at temperatures of 1500° F. or a temperature which is higher than the melting point of the fibers, the outer dozen or so planes of fiber in the outer laminations 11a, melt to form a cratered surface. In melting, it has been found that the glass fibers may part and then shorten as a globule 14 accumulates at the end of each fiber and when these globules and previously unmelted fibers have joined to form a rim of glass at the outer surface as shown diagrammatically at 15 in Fig. 8, a stabilized crater 16 seems to result, all craters being nearly the same diameter and disposed rather closely to one another.

When these craters are observed through a microscope, their appearance is somewhat similar to what one would see looking down on a basket ball loop with the net closed at the bottom and with an occasional fiber projecting into the void as represented at 14, 15 and 16 in Figure 8. This condition is especially noted when fine fiber or "paper" 11a is placed over a coarser base as at 12 in Fig. 4, indicating that a comparatively low viscosity is reached by the fine fiber early in the heating cycle. The surface/volume ratio is greater and the rate of heat absorption is greater for the fine fiber, and as the glass melts back and forms in effect a coarser fiber, the rate of heat absorption slows down so that stabilizing occurs.

This effect is beneficial in two ways. First, a more wear resistant surface is created on the outer laminations, than if single fibers only, constituted the top layers, the smoother partly glazed buffer zone being more resistant to abrasion. Secondly, the exposed filter area has a tendency to increase which gives an increased surface contact to the filter.

In one example, using a "glass paper" having fibers of approximately 4 microns diameter and subjecting laminations thereof to a heating cycle of 25 minutes at 1420° F. and then applying a pressure of 30 pounds per square inch for approximately 10 seconds, we produce a filter mass having a pore diameter of approximately 3 microns.

In another example, using fiber diameters of 10 microns and a temperature of 1420° F. for 25 minutes and the same pressure, we produce a filter mass having a pore size of approximately 5 to 7 microns.

The present invention also contemplates the use of suitable plastic fibers treated in a generally similar manner to form a filter disc. Various plastic fibers having the required thermoplastic properties, are available for use in connection with the manufacture of this type of filter disc. For example, synthetic fibers such as nylons, and vinyls can be formed in filaments of the required degree of fineness and possessing the necessary thermoplastic properties to be employed in the manufacture of these filter discs.

Figure 5:
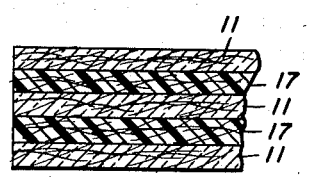
Figure 5 is a diagrammatic sectional view showing a further modification, including alternate layers of matted glass fiber and matted plastic fiber.

As illustrated in Figure 5, the filter disc may be formed by fusing alternate layers 11 of matted glass fiber and similar layers 17 of synthetic thermoplastic fibers. Such a filter disc may be constructed in a manner similar to one composed entirely of glass fiber and is generally similar in appearance and filtering characteristics. The intervening plastic laminations 17 must be of sufficient thickness to act as an adhesive between the adjacent surface of the glass fiber mats 11.

Figure 6:
Figure 6 is a similar view of a still further modification, comprising a filter formed entirely of laminations of matted plastic fiber.

It is also contemplated within the scope of this invention, to construct a filter disc entirely of plastic mats such as those just referred to. A disc of this type is illustrated in Figure 6 where it will be seen that a series of laminations 17 of synthetic non-woven fiber mats are fused in a similar manner to form the filter disc.

It will thus be seen that I have provided an improved filter disc having greatly increased strength over those previously known and wherein two adjacent plates are arranged in unsealed engagement. Filter discs having a "glass paper" layer only 0.03 inch thick on a single outer surface will withstand back-washing pressures of at least two atmospheres, which serves to illustrate the efficiency of the bonded system of the present invention.

It is to be noted that in the accompanying claims, the term "thin paper-like mat," embraces laminae of any of the various fibers above referred to, of diameters not greater than ten microns and prepared in layers of from approximately 0.01 to 0.05 inch in thickness.

From the foregoing it is believed that my invention may be readily understood by those skilled in the art without further description, it being borne in mind that numerous changes may be made in the details disclosed without departing from the spirit of the invention as set forth in the following claims.

I claim:

1. A bacterial filter element comprising a self-supporting disc formed of laminations of fibers of thermoplastic material, at least one outer lamina consisting of a thin paper-like mat of non-woven thermoplastic fibers having a diameter not greater than ten microns, the fibers throughout all laminations being compressed and fused to adjacent fibers at their junctions of contact, to form a unified porous mass having pore diameters not greater than seven microns.

2. A bacterial filter element comprising a self-supporting disc formed of laminations of fibers of thermoplastic material, at least one outer lamina consisting of a thin paper-like mat of non-woven glass fibers having a diameter not greater than ten microns, the fibers throughout all laminations being compressed and fused to adjacent fibers at their junctions of contact, to form a unified porous mass having pore diameters not greater than seven microns.

3. A bacterial filter element comprising a self-supporting disc formed of laminations of fibers of thermoplastic material, at least one outer lamina consisting of a thin mat of fine non-woven thermoplastic fibers having a diameter not greater than ten microns and another lamina consisting of a porous body of coarser material, the fibers throughout all laminations being compressed and fused to adjacent fibers at their junctions of contact, to form a unified porous mass having pore diameters not greater than seven microns.

4. A filter element as claimed in claim 3, wherein said thin mat is formed of glass fibers.

5. A filter element as claimed in claim 3, wherein all of said laminations are formed of glass fibers.

6. A filter element as claimed in claim 3, wherein both outer laminations of said disc are formed of glass fibers having a diameter not greater than ten microns and at least one inner layer of coarser material, is formed of plastic material having thermoplastic properties.

7. A bacterial filter element comprising a self-supporting disc formed of alternate laminations consisting of thin paper-like mats of non-woven glass fibers and non-woven fibers of plastic material having thermoplastic properties, the fibers throughout all laminations having a diameter not greater than ten microns and being compressed and fused to adjacent fibers at their junctions of contact, to form a unified porous mass having pore diameters not greater than seven microns.

8. A bacterial filter element comprising a self-supporting disc formed of laminations of fibers of thermoplastic material, at least one outer lamina consisting of a thin paper-like mat of non-woven thermoplastic fibers having a diameter not greater than ten microns, the fibers throughout all laminations being compressed and fused to adjacent fibers at their junctions of contact to form a unified mass, and the outer surface of said one outer lamina having a series of craters spaced throughout.

9. A filter as claimed in claim 3, wherein the outer surface of said outer lamina has a series of craters spaced throughout.

References Cited in the file of this patent

UNITED STATES PATENTS

| | | |
|---|---|---|
| 1,117,601 | Porter | Nov. 17, 1914 |
| 1,620,815 | Herschkowitsch et al. | Mar. 15, 1927 |
| 2,355,822 | Rugeley | Aug. 15, 1944 |
| 2,688,580 | Fingerhut | Sept. 7, 1954 |
| 2,692,654 | Pryor | Oct. 26, 1954 |
| 2,743,207 | Busch | Apr. 24, 1956 |